2,773,881
Patented Dec. 11, 1956

2,773,881

GLYCOL CARBONATES

Jesse T. Dunn, Charleston, W. Va., assignor to Union Carbide and Carbon Corporation, a corporation of New York No Drawing. Application February 9, 1953,
Serial No. 335,987

11 Claims. (Cl. 260—340.2)

This invention relates to an improved process for reacting oxirane compounds, such as ethylene and propylene oxides, with carbon dioxide at elevated temperatures and pressures to form glycol carbonates.

It has previously been proposed to conduct such reactions in the presence of sodium hydroxide, particularly when supported on activated carbon, as a catalyst. The space-time yields (pounds of product per cubic foot of reaction space per hour) are undesirably low with this catalyst. Also, serious explosions may result if ethylene oxide and sodium hydroxide are inadvertently combined in the absence of carbon dioxide.

By the method of the present invention, oxirane compounds are reacted with carbon dioxide to form glycol carbonates by a method which gives high space-time yields, which may be 100 pounds of product per cubic foot of reactor space per hour, and which presents no unusual hazards. This may be accomplished according to this invention by using a nitrogen-base catalyst and by operating at pressures above 500 p. s. i. and at temperatures between 100° C. and 400° C.

The oxirane compounds which are suitable in the practice of this invention are of the 3-membered oxirane series, that is the ring oxygen atom is attached to two adjacent carbon atoms, and the reaction which occurs between the oxiranes and carbon dioxide is an addition reaction which may be represented as follows:

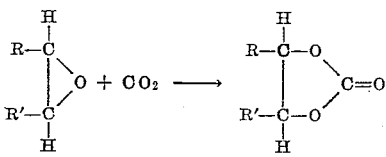

in which R and R' taken separately may be hydrogen, alkyl or aryl groups, and in which R and R' taken collectively may be alicyclic, aromatic or heterocyclic groups. Suitable oxirane compounds include ethylene oxide, propylene oxide, 1,2-epoxybutane, 2,3-epoxybutane, epoxyisobutylene, 1,2-epoxyhexane, 1,2-epoxyhexadecane, epoxycyclohexane and the like.

Suitable catalysts for the reaction comprise the class of the nitrogen-base compounds, such as the amines. Trimethylamine is the preferred amine catalyst. Triethylamine and the higher alkyl tertiary amines are also suitable but are somewhat less efficient as the catalytic effectiveness of the tertiary amine group is diluted and impaired by the larger alkyl groups. Preferably, therefore, these alkyl groups should contain from one to four carbon atoms. Primary and secondary amines, while being effective catalysts for this reaction, are less suitable because they can react with oxiranes to yield alkanol amines which in turn can react with additional amounts of oxiranes thereby leading to lower efficiencies and larger catalyst requirements. Examples of suitable primary and secondary amines include mono- and diethyl amine, mono- and di-isopropyl amine, mono- and dibutyl amine, and piperidine.

The required catalyst concentration may vary widely from about 0.1% on the total reactants to as high as 12%. The catalyst concentration is dependent upon such factors as temperature, contact time, the particular catalyst involved, the structure of the oxirane compound, the solubility of the catalyst in the reactants and the amount of diluent used. The catalyst may be dissolved in the reaction diluent when such is employed or it may be admitted directly to the reaction zone through a metering pump. Premature contact between the catalyst and the oxirane compound is generally to be avoided in order to minimize the opportunity of undesirable side reactions which result in decreased yields of the desired glycol carbonates.

Induction periods are sometimes encountered in starting up a reactor on a run made in the absence of a diluent. On such occasions the use of increased catalyst concentrations to two or three times the quantities normally employed are beneficial in eliminating the induction period. Likewise, the introduction of small amounts of a glycol carbonate initiates an immediate reaction.

The reaction of an oxirane compound and carbon dioxide in accordance with this invention can be effected either in the presence or in the absence of a diluent. Under certain conditions the use of a non-reactive diluent assists in temperature control and permits the handling of the reactants at lower pressures than are otherwise possible. Where suitable high pressure equipment is available the use of diluents may be dispensed with. Non-reactive diluents that have been found effective include dioxane, benzene, and crude glycol carbonates. The use of a diluent does not have an appreciable effect on the yield or efficiency of the reaction but the production of glycol carbonates per unit volume of equipment vary inversely with the amount of diluent employed.

On the other hand the use of an excess of carbon dioxide also may be employed to aid in the control of reaction temperatures. Furthermore, side reactions involving the polymerization of the oxirane compound to residues are minimized and subsequent refining operations are facilitated.

Suitable equipment for carrying out the process may be either a kettle-type autoclave equipped with a stirrer or a tube-type autoclave. Either type autoclave requires suitable temperature control, accessory feed tanks, pumps and control instruments for pressure and temperature. The kettle-type autoclave is more suitable for batch-type reactions while the tube autoclave is preferred for continuous operation. High yields can be obtained by either procedure.

In carrying out the batch process, the order of addition of the reactants to the autoclave is not critical but it is desirable that an excess of carbon dioxide should be present when the charge is heated to the reaction temperature. Failure to observe this precaution on operating procedure may lead to the formation of oxide polymers with a corresponding loss in yield.

In the continuous process, the tubular autoclave is filled with carbon dioxide at the desired reaction temperature and pressure and the two reactants (oxirane compound and carbon dioxide) and catalyst are then introduced simultaneously, and usually, as three separate feed streams. The oxirane compound and carbon dioxide may be fed in an equal molar ratio, but an excess of carbon dioxide is desirable to minimize the formation of oxirane polymers.

Although the pressure range and temperature range are not critical, the reaction proceeds in a satisfactory manner at temperatures between 100° C. and 400° C. and at pressures above 500 p. s. i. At lower temperatures and pressures the production ratio is low. Excessive temperatures result in decreased yields while the maximum usable pressures are limited only to considerations of equipment design and cost. The preferred temperature range is between 180° C. and 260° C. and the preferred pressure range is between 1800 p. s. i. and 2400 p. s. i.

The crude reaction product, obtained from either the batch or the continuous process, may be refined by first stripping off any low-boiling material such as unreacted oxirane compounds and impurities introduced with the reactants and catalyst. The product is then treated with an acid to neutralize the contained nitrogen bases. A high-boiling polybasic acid is generally preferred in order that the acid and the neutralized salt of the nitrogen bases will be retained in the residue during the subsequent distillation of the product. Sulfuric and phosphoric acids are ordinarily preferable due to their availability and low cost but other acids that are either high-boiling or yield high-boiling products upon reaction with the nitrogen bases are suitable. Introduction of water during the neutralization of the catalyst should be avoided or minimized since it will tend to promote the hydrolysis of the glycol carbonate ester.

As the final step in the purification process, the glycol carbonate is separated from the catalyst residue by stripping under reduced pressure, and then distilled through an efficient column to separate the product from the small amount of glycol that may be present. When the introduction of water and the consequent formation of glycols is avoided, it is generally possible to obtain a product containing better than 97% of the ester by distillation though a short, packed column. High-boiling glycol carbonates, if not distillable, may be purified by fractional crystallization or by solvent extraction.

Example 1

A solution consisting of 200 grams of ethylene oxide, one liter of dioxane and 40 grams of piperidine was placed in a three-liter, stainless steel, rocking autoclave at a temperature of about 0° C. The dioxane had been freshly distilled to insure substantially complete removal of water. After the atmosphere above the liquid had been purged to remove oxygen, carbon dioxide was added and the pressure was finally adjusted to 450 p. s. i. at 17° C. The reaction mixture was slowly heated to a final temperature of 180° C. Reaction became apparent at 155–160° C. although additional reaction was observed by noting a pressure decrease at the final temperature. A maximum pressure of 3600 p. s. i. was recorded at 160° C. and this decreased to a final value of 2600 p. s. i. The total reaction time was about five hours.

The cooled product (1361 grams) was discharged (after relieving the pressure), neutralized with glacial acetic acid, and fractionally distilled. After removal of carbon dioxide, ethylene oxide and solvent, glycol carbonate (209 grams) was obtained in fractions boiling from 80° C. to 96° C. at 2 mm. Upon refractionation nearly all of this distilled at 65° C.–67° C. at about 1 mm. and froze at 34° C.–34.5° C. Crystals, when washed with ethanol and dried, melted at 36° C.–37° C., and gave no depression when melted with an authentic sample.

Example 2

A one-gallon, stainless steel autoclave was charged with: 500 grams of redistilled dioxane and 51 grams of triethylamine. The autoclave was equipped with a pump for feeding liquid carbon dioxide and ethylene oxide solution. The contents of the autoclave were stirred and heated while carbon dioxide was fed, so that a pressure of 3000 p. s. i. was reached at 200° C. A solution consisting of 600 grams of ethylene oxide and 600 grams of redistilled dioxane was fed in over a period of three hours. Liquid carbon dioxide was pumped in as required to maintain a pressure of about 3000 p. s. i., some additional amount being required, for 15 minutes after all of the ethylene oxide had been added. The reaction was discontinued shortly thereafter.

The crude product was distilled under mild vacuum to remove unreacted ethylene oxide (14 grams), catalyst and solvent. The remainder was quickly stripped under vacuum, and the ethylene carbonate obtained as a fraction distilling at 82° C.–105° C., at 2–5 mm. amounted to 1133 grams. The ester was obtained in a substantially pure form as a colorless liquid which almost completely crystallized upon cooling. Analysis indicated the presence of minute amounts of amine bases and ethylene glycol as impurities. The residue weighed 33 grams.

As a means of further purification and to avoid the formation of a yellow coloration upon standing, the products were treated with phosphoric (or sulfuric) acid to pH 1–2, stripped and finally fractionated under vacuum. The glycol carbonate thus refined showed almost no tendency to form color upon standing. The residue from such purification amounted to about two percent.

Example 3

Ethylene carbonate was prepared in a continuous-type reactor using approximately 0.6% trimethylamine as a catalyst and 80% of dioxane as a diluent, based on total feeds. Ethylene oxide and carbon dioxide were fed in about an equal molar ratio, and the reaction was carried out at a temperature of 220° C. to 240° C. and at a pressure of 2000 p. s. i. The reactor consisted essentially of a jacketed, 17-foot, stainless steel tube having an estimated volume of 2.7 liters in the reaction zone. A thermowell extended 13 feet from the bottom of the reactor. Feeds were pumped into the bottom of the reactor at a rate which approximated 4000 grams per liter of reactor space per hour. The effluent product passed through a regulating valve, which maintained the pressure at 2000 p. s. i., and was collected under pressure in steel cylinders. Two samples representing about 15 minutes operation time were taken as representative of operations under the applied conditions. Both samples were vented to atmospheric pressure through a gas meter, and unreacted oxide and most of the dioxane were removed by distillation at atmospheric pressure to a kettle temperature of 120° C. An excess of phosphoric acid (100 grams) was added to the resulting crude reaction products, and contained ethylene carbonate was then separated from high-boiling residues by distillation under reduced pressure. Calculated yields, efficiencies and production ratios are tabulated below.

| Sample | A | B |
| --- | --- | --- |
| Sample weight, grams | 2,698 | 2,808 |
| Ethylene carbonate, grams (96%) | 461 | 481 |
| Recovered ethylene oxide, grams | 21 | 18 |
| Recovered carbon dioxide, grams | 56 | 51 |
| Recovered dioxane, grams | 2,158 | 2,212 |
| High-boiling residues, grams | 17 | 16 |
| Total accounted for, grams | 2,713 | 2,778 |
| Estimated yield to ethylene carbonate based on ethylene oxide, percent | 79.0 | 77.3 |
| Estimated efficiency to ethylene carbonate based on ethylene oxide, percent | 85.5 | 82.6 |
| Estimated production ratio to ethylene carbonate, grams per liter of reaction space per hour | 656 | 687 |

Example 4

Ethylene oxide was reacted with approximately a 60% excess of carbon dioxide in the tubular reactor of Example 3 in the presence of 1.4% of trimethylamine and 74% of dioxane based on total feeds. Temperatures in the reaction zone were maintained at 174° C. to 186° C. at a pressure of 1500 p. s. i. and feed rates were adjusted to about 4000 grams per liter of reaction space per hour. Distillation of a representative sample (2729 grams) gave 173 grams of recovered ethylene oxide and 195 grams of a fraction which distilled at 85° C. at 7 mm. to 106° C. at 10 mm. and contained 97% ethylene carbonate. This corresponds to a 34% yield based on ethylene oxide with an 88% efficiency and a production ratio of 280 grams per liter of reaction space per hour.

Example 5

Proplene oxide was reacted with a 50% molar excess of carbon dioxide in the tubular reactor of Example 3 at 224° C. to 228° C. and 2000 p. s. i. Trimethylamine (1% on weight of reactants) was used as a catalyst, and to facilitate its uniform introduction into the reactor it was fed as an 8% solution in dioxane. Feed rates for the two reactants and catalyst solution were adjusted to approximately 3000 grams per liter of reactor space per hour.

Distillation of a representative sample ((2259 grams) obtained under these conditions gave 1572 grams of material which boiled at approximately 90° C. at 5 mm. and both the density $$(d_{20}^{20} 1.205)$$

and analysis for carbon dioxide liberated by alkaline hydrolysis indicated that it contained 96% propylene carbonate. The high boiling residue from this distillation amounted to only 15 grams. Dioxane and carbon dioxide accounted for most of the rest of the sample. The yield to propylene carbonate exceeded 85% based on propylene oxide fed and the production ratio approximated 1700 grams per liter of reactor volume per hour.

The glycol carbonates produced according to this invention are of value as chemical intermediates and as solvents for fiber-forming resins.

What is claimed is:

1. Process for making glycol carbonates which comprises reacting an oxirane with carbon dioxide at a pressure above 500 p. s. i. and at a temperature between 100° C. and 400° C. in the presence of an alkyl amine containing from one to four carbon atoms in each alkyl radical as a catalyst; the oxirane having the ring oxygen atom attached to two adjacent carbon atoms to which are attached radicals of the group consisting of hydrogen and alkyl radicals.

2. Process for making glycol carbonates which comprises reacting an oxirane with carbon dioxide at a pressure above 500 p. s. i. and at a temperature between 100° C. and 400° C. in the presence of a dialkyl secondary amine containing from one to four carbon atoms in each alkyl radical as a catalyst; the oxirane having the ring oxygen atom attached to two adjacent carbon atoms to which are attached radicals of the group consisting of hydrogen and alkyl radicals.

3. Process for making glycol carbonates which comprises reacting an oxirane with carbon dioxide at a pressure above 500 p. s. i. and at a temperature between 100° C. and 400° C. in the presence of a trialkyl tertiary amine containing from one to four carbon atoms in each alkyl radical as a catalyst; the oxirane having the ring oxygen atom attached to two adjacent carbon atoms to which are attached radicals of the group consisting of hydrogen and alkyl radicals.

4. Process for making glycol carbonates which comprises reacting an oxirane with carbon dioxide at a pressure above 500 p. s. i. and at a temperature between 100° and 400° C. in the presence of trimethylamine as a catalyst; the oxirane having the ring oxygen atom attached to two adjacent carbon atoms to which are attached radicals of the group consisting of hydrogen and alkyl radicals.

5. Process for making glycol carbonates which comprises reacting an oxirane with carbon dioxide at a pressure above 500 p. s. i. and at a temperature between 100° C. and 400° C. in the presence of triethylamine as a catalyst; the oxirane having the ring oxygen atom attached to two adjacent carbon atoms to which are attached radicals of the group consisting of hydrogen and alkyl radicals.

6. Process for making glycol carbonates which comprises reacting an oxirane with carbon dioxide at a pressure above 500 p. s. i. and at a temperature between 100° C. and 400° C. in the presence of piperidine as a catalyst; the oxirane having the ring oxygen atom attached to two adjacent carbon atoms to which are attached radicals of the group consisting of hydrogen and alkyl radicals.

7. Process as claimed in claim 1 in which the oxirane is ethylene oxide.

8. Process as claimed in claim 1 in which the oxirane is propylene oxide.

9. Process as claimed in claim 1 in which the molar ratio of carbon dioxide to the oxirane is greater than one.

10. Process as claimed in claim 1 in which the oxirane is reacted with carbon dioxide in the presence of an inert diluent.

11. Process as claimed in claim 1 in which the oxirane is reacted with carbon dioxide in the presence of dioxane.

References Cited in the file of this patent

UNITED STATES PATENTS

| 2,511,942 | Prichard | June 20, 1950 |

FOREIGN PATENTS

| 740,366 | Germany | Oct. 19, 1943 |